United States Patent [19]
Hormel et al.

[11] Patent Number: 5,432,817
[45] Date of Patent: Jul. 11, 1995

[54] VEHICLE COMMUNICATIONS NETWORK TRANSCEIVER, GROUND TRANSLATION CIRCUIT THEREFOR

[75] Inventors: Ronald F. Hormel, Clinton Township, Macomb County; Frederick O. Miesterfeld, Troy, both of Mich.

[73] Assignee: Corporation Chrysler, Highland Parks, Mich.

[21] Appl. No.: 252,706

[22] Filed: Jun. 2, 1994

Related U.S. Application Data

[63] Continuation-in-part of Ser. No. 951,989, Sep. 28, 1992, abandoned.

[51] Int. Cl.$^6$ ............................................. H04L 25/00
[52] U.S. Cl. .................................... 375/257; 375/259; 375/238; 341/135; 327/108
[58] Field of Search ................. 375/22, 37, 36, 7, 121; 341/135, 136; 364/431.12; 370/8, 9; 307/270; 327/108–112

[56] References Cited

U.S. PATENT DOCUMENTS 4,594,577 6/1986 Mao ........................................ 375/30
4,736,323 4/1988 Utsumi et al. .................. 364/431.12

OTHER PUBLICATIONS

Title: "Reduction Techniques in Electronic Systems" (Second Edition); Author: Henry W. Ott, Publisher: John Wiley & Sons; New York; 1988; pp. 95–99.

Primary Examiner—Stephen Chin
Assistant Examiner—Hai H. Phan
Attorney, Agent, or Firm—Wendell K. Fredericks

[57] ABSTRACT

A ground translation circuit in a transmitter of a transceiver of a data transmission network for transferring symbol information contained in analog pulses from circuits referenced to logic signal power to circuits referenced to an independent DC voltage ground return for transmission over a bus. Complementary ground translation circuits in a receiver of the transceiver for transferring the analog pulses referenced with respect to the independent DC ground return back to circuits referenced to logic signal power.

5 Claims, 3 Drawing Sheets

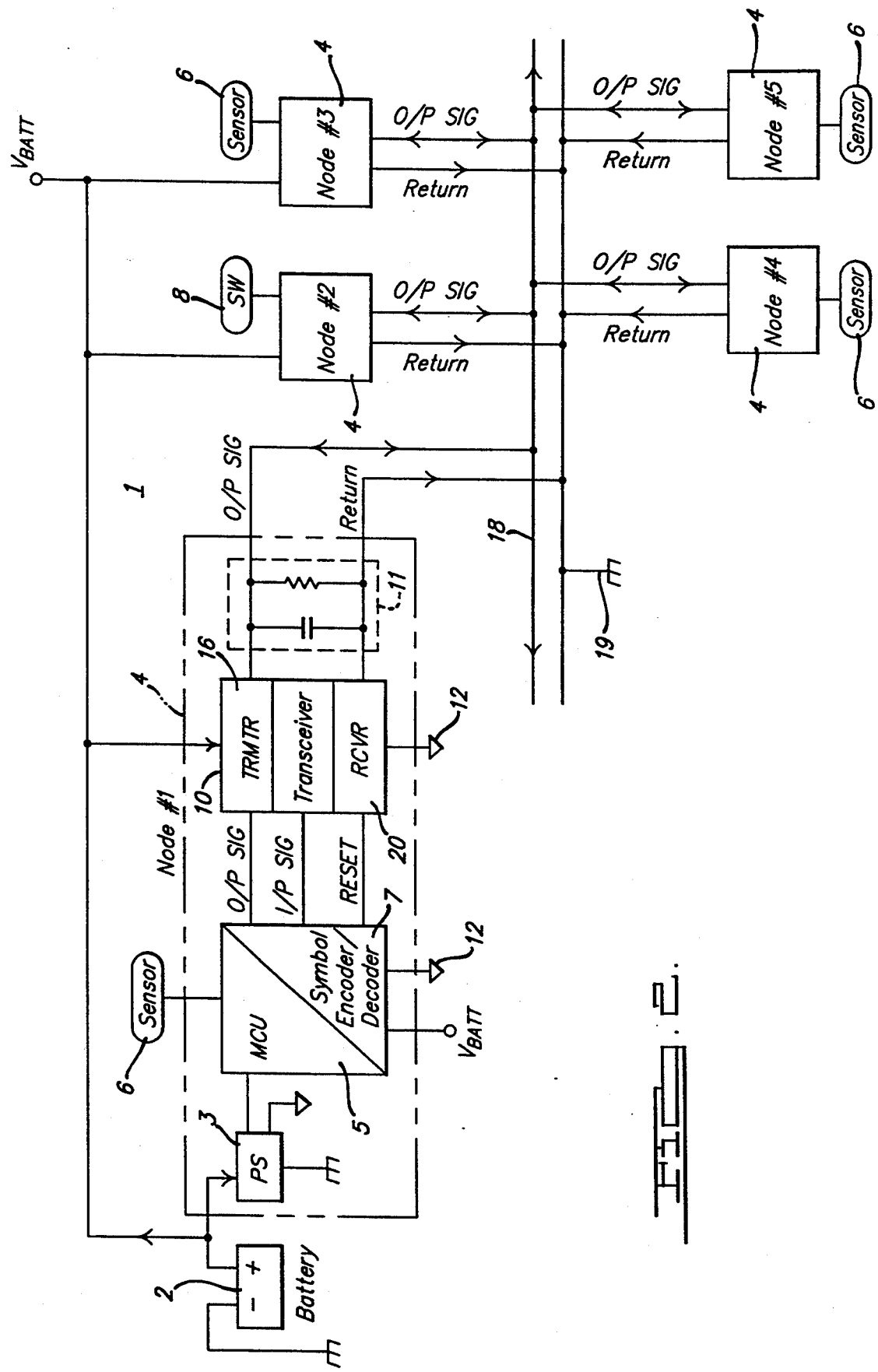

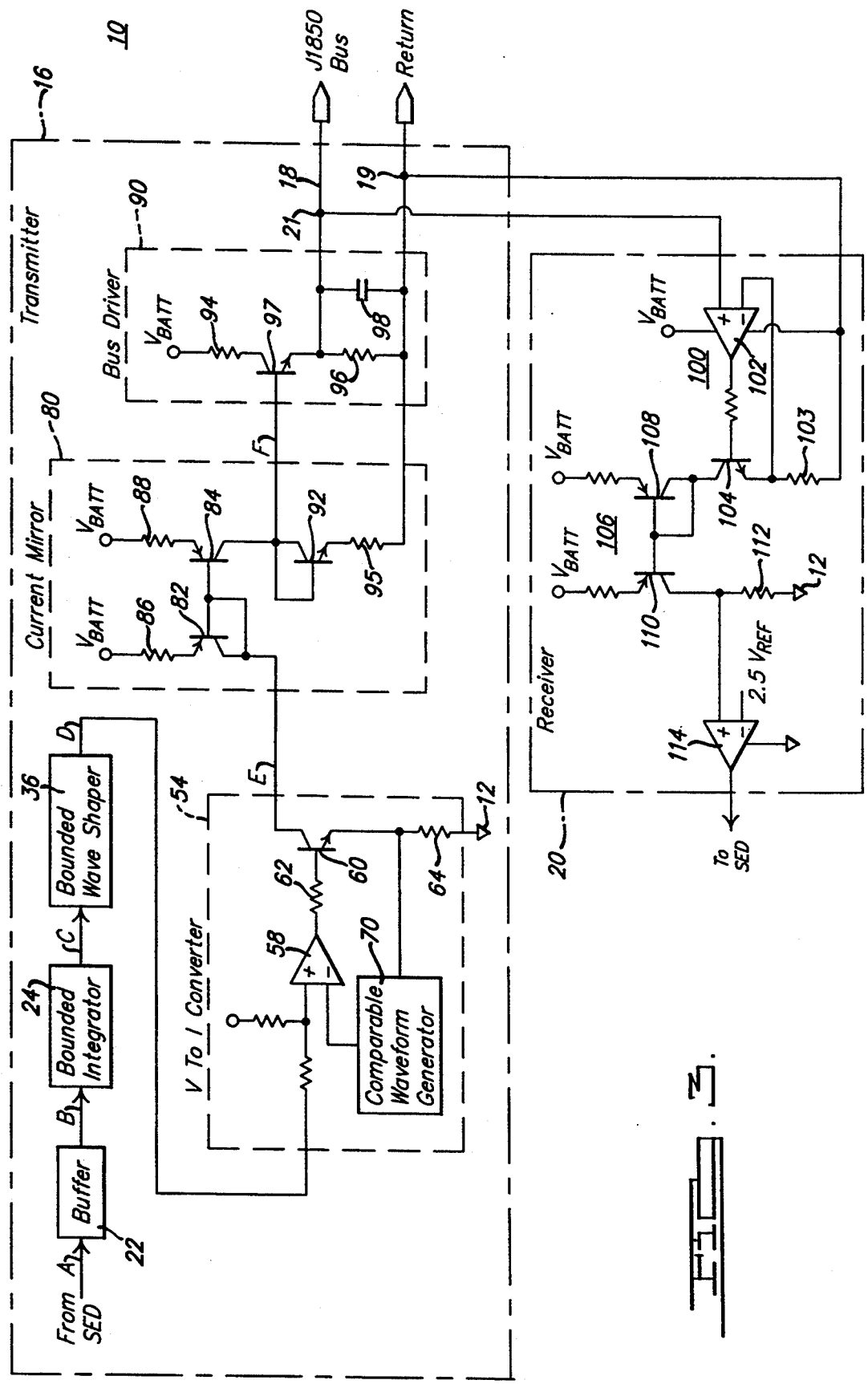

VEHICLE COMMUNICATIONS NETWORK TRANSCEIVER, GROUND TRANSLATION CIRCUIT THEREFOR

This is a continuation-in-part of U.S. patent application Ser. No. 07/951,989, filed Sep. 28, 1992, abandoned.

BACKGROUND OF THE INVENTION

In communications networks where multiplexing schemes transfer pulse signals from one node to another, usually ground loops become a source of noise. Noise results especially when large distances separate multiple ground points and during employment of low-level analog circuits. It becomes necessary to provide some form of discrimination or isolation against ground path noise and direct current offset voltages.

Grounding of nodes in multinode systems occur at different points resulting in potential differences between grounds; e.g., chassis ground and signal ground. Grounding components in vehicles necessitate this grounding approach. This usually causes unwanted noise voltages in the network. The magnitude of signal levels compared to noise voltages in the network provides a signal-to-noise ratio. If the signal-to-noise ratio affects network operations, then effort to improve the ratio must take place.

Past noise reduction remedies included two basic approaches: 1) avoid the ground loops by removing one of the type grounds and converting the system to a single-point ground network. (This provides an impractical remedy since DC currents cause very large voltage drops); 2) eliminate or minimize the effects of multiple grounds by isolating the two or more circuits. Isolation can be achieved by using: 1) transformers, 2) common-mode chokes, 3) optical couplers and 4) balanced circuitry.

Such techniques yield favorable results, but these techniques require large numbers of isolating components. Such components are costly and may introduce other adverse effects entirely unanticipated.

In an effort to minimize isolation problems in multinode networks, a search took place to find other means of isolating ground loops in multinode networks. That search resulted in the present invention which substantially eliminates noise potentials between grounds in multinode networks.

SUMMARY OF THE INVENTION

The present invention concerns combatting ground noise within transceivers and between transceivers of nodes associated with a multiplexed communications system. In each transceiver, current mirror and programmed control current techniques permit translating analog symbol signals from digital and analog signal ground circuits to circuits associated with bus ground. This transfer occurs with some voltage gain in the signal but without any voltage offsets due to ground noise and with no lost in integrity of the symbol signals.

BRIEF DESCRIPTION OF THE DRAWING

FIG. 2 depicts a multinode network in which the circuits of the present invention apply;

FIG. 3 illustrates in schematic and block diagram form a transceiver employing the translation scheme of this invention.

DETAILED DESCRIPTION OF A PREFERRED EMBODIMENT

Figure 1A:
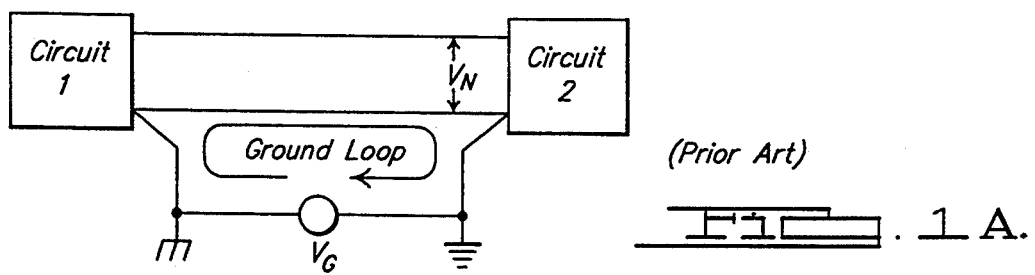
FIG. 1 (A-E) illustrates in block diagram form previous remedies for minimizing ground loop problems in multinode networks.

With reference to FIG. 1 (previous ground loop circuit solutions), FIG. 1A depicts a system grounded at two different points with a potential difference (Vg) between a signal ground and a chassis ground.

Figure 1B:
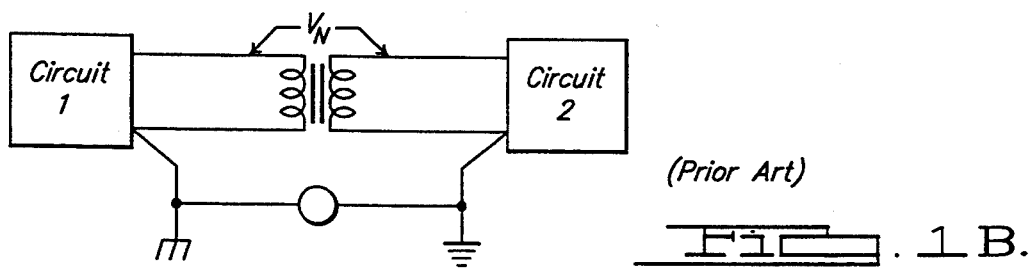

One approach for isolating the noise shown in FIG. 1B requires a transformer. The ground noise voltage now appears between the transformer windings and not at the input to the circuit. Such transformers are costly and multiple circuits require multiple transformers.

Figure 1C:
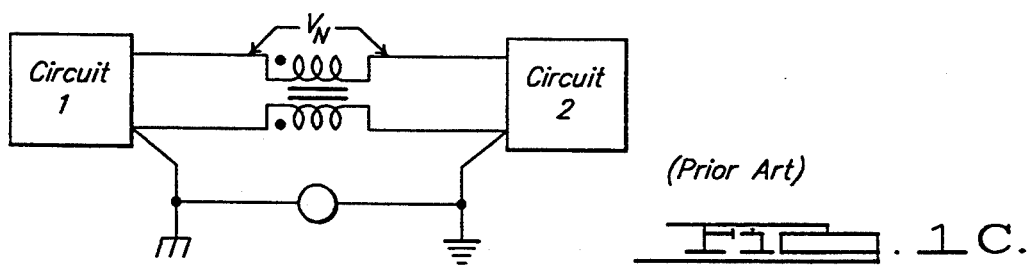

Prior solution technique of FIG. 1C depicts two circuits isolated with a transformer connected as a common-mode choke (also called a longitudinal choke, neutralizing transformer or balun). This transformer arrangement will transmit DC and differential-mode signals while offering high impedance to common-mode noise current.

Figure 1D:
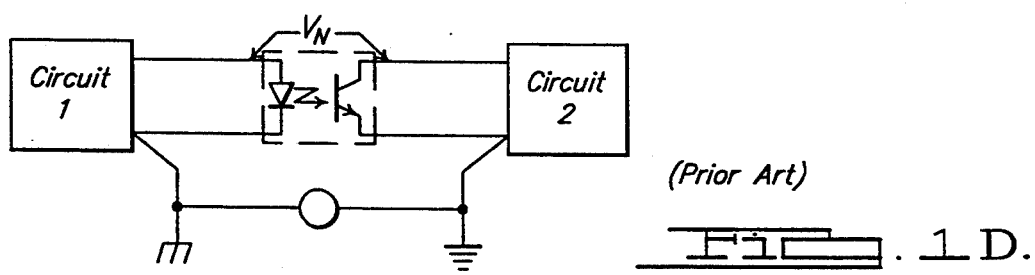

FIG. 1D depicts optical coupling as a means for eliminating common-mode noise. Such coupling breaks the metallic path between two grounds, but optical couplers usually perform poorly for analog circuits because of unsatisfactory linearity through the couplers. Such circuits require two-way networks to accomplish bi-directional communication.

Figure 1E:
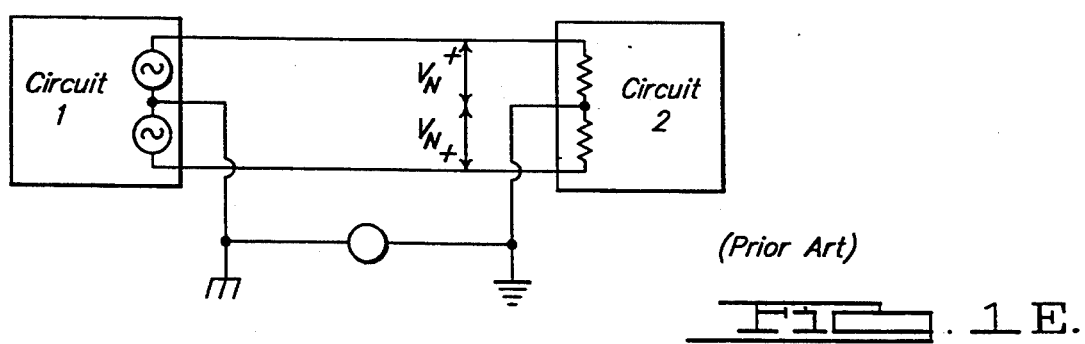

FIG. 1E illustrates a balanced circuit. In this circuit, common-mode voltages induce equal currents in both halves of the balanced circuit and the balanced receiver responds only to differences between the two inputs. The better the balance, the larger the amount of common-mode rejection.

These prior solutions require specific components for developing isolation in the network. These specific components perform the intended isolation function but usually without enhancing the quality of the pulse transmissions.

THE PRESENT INVENTION

FIG. 2 depicts a multiplexing network 1 that includes the novel isolation scheme contained in a transceiver of the present invention. With the negative terminal grounded to the chassis of a vehicle, battery 2 supplies battery power ($+V_{batt}$) to the network nodes.

Each 5-volt DC regulated power supply 3 in each of the identical of nodes 4—4 receives $V_{batt}$ and provides, at an output terminal, suitable regulated 5 Vdc to a plurality of signal conditioning circuits. In addition to the regulated power source 3, each node 4 contains a microcontroller (MCU) 5, preferably an 8-bit, single-chip microcontroller, a suitable symbol encoder/decoder(SED) 7, a transceiver 10 and a termination network 11.

MCU 5 receives sensor or switch signals and then uses the signals to generate control signals for manipulating SED 7 to produce a plurality of message symbols in a suitable Variable Pulse Width Modulation VPWM format. Transceiver 10, interfaced with bus 18 through a termination network 11, accepts the message symbols from SED 7 and translates message symbols referenced with respect to a signal ground return circuit to message symbols referenced with respect to bus ground return. Transceiver 10 then transmits the messages over bus 18 in an analog VPWM format to other nodes 4—4.

Each transceiver 10 contains waveshaping and bus transfer circuits. A separate ground return (signal ground return 12) relates to waveshaping circuits while an independent ground return 19 relates to bus transfer circuits. The waveshaping circuits of the transceiver appear in a U.S. patent Ser. No. 5,337,042 dated Aug. 9, 1994 of the present inventors.

Bus 18, unlike conventional single-wire buses, does not depend on a large number of turns of twisted wire or shielding material to minimize noise. Bus 18 routes throughout the small area network as an untwisted wire with untwisted wire extensions depending from each node. Some of the noise control results from shaping of the VPWM signals received at the transmitting and receiving portion of transceiver 10.

Also in FIG. 2, block diagrams portray several other nodes 4—4 employing the transceiver 10. The single-wire bus 18 routes to interconnect the other nodes 4—4. Transceiver 10 includes both transmitter (TRMTR) 16 and receiver (RCVR) 20 circuits. This invention discloses the ground translation circuits in TRMTR 16 and RCVR 20.

The Transceiver Circuits

With reference now to FIG. 3, this figure depicts in partial block diagram and schematic diagram form a transceiver 10 of the present invention. SED 7 of FIG. 2 produces a plurality of message symbols in a suitable VPWM square-wave format. The square wave signal enters buffer 22 at port A of FIG. 3 and then leaves through port B to enter bounded integrator 24.

Bounded Integrator

Integrator 24 inverts and integrates the square-wave signal and then produces at an output port C a symmetrical trapezoid type waveform signal. The trapezoid signal carries pulses having edges with lengthened rise and fall times, reduced amplitudes and established trigger-point-voltages. The established trigger-point-voltages maintain each symbol length equidistant with respect to the pulse width of the symbols expressed in the input square-wave waveform.

Bounded Waveshaper

Bounded waveshaper 36 receives the output signal from bounded integrator 24 at point C. Waveshaper 36 reshapes both pulse corners at the extremities of each edge over a chosen duration. It then produces at port D another trapezoid waveform signal in phase with the input waveforms which includes pulses with increased curvature corners and increased amplitudes with respect to the trip-point voltage.

Voltage-To-Current Converter

The reshaped trapezoid waveform signal at point D enters voltage-to-current converter device 54 and gets transformed into a controlling voltage for the input loop of buffer transistor 60.

The voltage-to-current converter device 54 includes a operational amplifier (op-amp) 58 and transistor 60. The reshaped trapezoid waveform signal at port D applies to a non-inverting terminal of op-amp 58. Op-amp 58 performs a voltage difference measurement with respect to a comparable waveform generated from a feedback associated circuit 70 applied to an inverting terminal. The output of op-amp 58, an analog signal, gets amplified and applied to the base of transistor 60 through a base resistor 62 providing base current to the input loop of the transistor. Battery current from current mirror 80 enters, through the collector terminal, the output loop of transistor 60. This output loop provides a programmed current-sink circuit used to sink current at port E routed from a current mirror circuit 80. Transistor 60 controls the amount of current-sinking between the collector and emitter terminals. Changes in the base voltage cause corresponding changes in the emitter voltage across the emitter resistor 64.

First Current Mirror Circuit

Current mirror device 80 connected, in this embodiment to raw battery power, reacts to controlled current signals of buffer transistor 60 in the voltage-to-current converter device 54 connected to one output of device 80. Current mirror device 80 uses the technique of matched base-emitter biasing of matched-pair dual PNP transistors 82 and 84 to produce a current source output which mirrors the controlled current signal. Transistor 82 of the matched pairs acts as a reference diode with its base terminal shorted to the collector terminal and its emitter terminal connected to a first input terminal which supplies $V_{BATT}$ through an emitter resistor 86. The emitter terminal of transistor 84 connects to a second input terminal which supplies $V_{BATT}$ through emitter resistor 84.

The current output path of referenced diode 82 routes to the collector of buffer transistor 60 of device 54 and returns to signal ground 12. When transistor 60 operates, it sinks the reference diode current to signal ground. This causes a Vbe of transistor 82 appropriate to that current at the circuit temperature and for that transistor type. Transistor 84 matched to transistor 82 thereby sources the same current to another transistor 92 connected as a reference diode. The emitter of transistor 92 returns current through an emitter resistor 95 to bus return 19, a return independent of signal ground 12.

With transistor 92 connected as the second reference diode, the voltage across resistor 95 clamps at one diode drop below the voltage appearing at port F.

The pulse voltage across resistor 95 and independent ground 19, illustratively, of about 8.0 $V_{p-p}$, exhibits about 4 times the pulse voltage appearing across resistor 64 and signal ground 12. The pulse width (PW) of both pulses remain constant at, illustratively, 64 $\mu$s at the trip points regardless of the changes in ground potential in each node of the network. Hence, any voltage offsets of the signal and bus grounds in each node will not affect the symbol timing content of the messages transferred over the bus.

Bus Driver Circuit

As mentioned supra, the voltage appearing at port F, about 4 times the pulse voltage across resistor 64 of device 54, provides base voltage to emitter-follower connected transistor 97 of bus driver circuit 90. The voltage at the emitter resistor 96 of transistor 97 follows the base voltage; hence, transistor 97 sources current to bus 18 now referenced to independent bus return 19. Resistor 96 and capacitor 98 form a termination network for bus 18.

Receiver Circuit

From bus 18 at node 21, bus voltage, referenced to bus return 19, and symbol information immediately route back to the input of receiver 20, an active load. There, another voltage-to-current converter circuit 100, including an operational amplifier 102, terminating resistor 103 and a buffer transistor 104, controls the current in an input circuit of another current mirror circuit 106.

Current mirror circuit 106 comprised of referenced diode 108 and output transistor 110 supplies programmed pulse current to load resistor 112 referenced now to signal ground 12 in an output circuit. Translation of signals from bus return 19 back to signal return 12 occur in current mirror circuit 106. Battery voltage connected to the emitter of referenced diode transistor 108 causes current to flow in the output loop of transistor 108 and into the output loop of current-sink transistor 104 of the voltage-to-current converter 100. The current in the output loop of transistor 104 is controlled by the changes in base voltage seen at the output of the voltage difference circuit 102. One input terminal of circuit 102 connects to bus 18 and a second terminal connects to one end of terminator resistor 103. The other end of resistor 103 connects to bus return 19. The output of circuit 103 provides analog voltage changes to the base terminal of transistor 104 in response to the potential differences existing between the analog voltage waveform on bus 18 and the voltages across resistor 103. The analog voltage changes to the base of transistor 104 cause current in the output loop of transistor 104 to vary in response to the potential difference detected. Since circuit 106 is a current mirror circuit, the same amount of current flowing in the output loop of transistor 104 will flow in the output loop of transistor 110. Comparator 114 compares the voltage across resistor 112 with a fixed referenced voltage, illustratively 2.5 Vdc. The output of comparator 114 provides digital pulse signals referenced with respect to signal ground to SED 7 of FIG. 2. The pulse width of the analog signals remains consistent from the input terminal of the voltage-to-current converter 102 to the output terminal of the voltage comparator 114. SED 7 uses the digital signal to extract symbol information from the pulses.

It is to be understood that the above-described embodiment mainly illustrates the principles of the present invention. Although a combination of discrete component/integrated circuit embodiment is disclosed, a combination integrated circuit/firmware/software equivalent could be developed. One skilled in the art may make changes and modifications to the embodiment disclosed herein and may devise other embodiments without departing from the scope and essential characteristics thereof.

We claim:

1. A ground translation circuit in a transmitter circuit of a transceiver for translating analog signals from a first ground return to a second ground return comprising:

a) a first voltage-to-current converter for receiving at an input terminal incoming analog voltage waveforms referenced to the first ground return, the first voltage-to-current converter having a voltage difference measurement circuit with an output connected to an input loop of a current-sink transistor circuit, the voltage difference measurement circuit having a feedback loop tapped into an output loop of the current-sink transistor circuit that includes a waveform generator circuit for producing a comparison analog voltage waveform which applies to a second input terminal of the voltage difference measurement circuit, the voltage difference measurement circuit producing at an output port analog voltage signals proportional to the difference between the incoming analog voltage waveform and the comparison analog voltage waveform, the analog voltage signals routing to the input loop of the current-sink transistor circuit for providing base analog current signals which regulates the amount of current sinking that is done in the output loop of the current-sink transistor circuit, wherein changes to base voltage of the current-sink transistor circuit cause corresponding changes in emitter voltage applied across an emitter resistor of the current-sink transistor circuit, wherein one end of the emitter resistor is connected to an emitter of the current-sink transistor circuit and the other end is connected to the first ground return;

b) a single wire bus referenced with respect to the second ground return separate from the first ground return;

c) a first current-mirror circuit comprised of:

(i) a first input terminal and a second input terminal for receiving direct current (DC) voltage from a raw power source;

(ii) a matched pair of transistors with a base terminal of each transistor of the matched pair of transistors interconnected, a first transistor of the matched pair of transistors configured as a referenced diode with an emitter terminal connected to the first input terminal through an emitter resistor and a collector terminal connected to the interconnected base terminals and providing a first output junction point for analog current that flows out from the collector terminal of the first transistor, a second transistor of the matched pair of transistors having an emitter terminal connected to the second input terminal through another emitter resistor to receive the DC voltage and a collector terminal for sourcing an equal amount of analog current that flows out of the collector terminal of the first transistor, the first output junction point being connected to the collector of the current-sink transistor circuit in order to source current to the output loop of the current-sink transistor circuit; and (iii) a first independent transistor also configured as a reference diode wherein the collector connects directly to the base of a second junction point and wherein an emitter of the independent transistor connects to the second ground return through an emitter resistor, the second junction point being connected to a collector terminal of the second transistor of the matched pair of transistors so as to receive the equal amount of analog current that flows out from the collector terminal of the first transistor of the matched pair of transistors;

d) a bus driver circuit consisting of a second independent transistor having a collector terminal connected to receive a DC voltage referenced with respect to the second ground return through a collector resistor and a base terminal connected to the second junction point of the first current-mirror circuit, the analog current in the output loop of the second transistor of the matched pair of transistors of the first current-mirror circuit regulating the amount of analog current that flows in the base terminal of the second independent transistor and out of the emitter terminal of the second independent transistor and on to the single-wire bus, a first terminator resistor connected between the emitter terminal of the second independent transistor and the second ground return providing changes in voltage across the single-wire bus in response to the incoming analog voltage waveforms reference to the first ground return; and e) an active load forming a receiver circuit for the transceiver containing:

(1) a second voltage-to-current converter circuit having a voltage difference circuit that has one input terminal connected to the single-wire bus and a second terminal connected to one end of a second terminator resistor, the other end of the second terminator resistor being connected to the second ground return, the voltage difference circuit providing analog voltages to a base terminal of a second current-sink transistor circuit, the second voltage-to-current converter being used for determining potential differences existing between the analog voltage waveforms on the single-wire bus and the voltage across the second terminator resistor with respect to the second ground return, the second voltage-to-current converter producing at an output terminal analog voltages that route to the base terminal of the second current-sink transistor circuit referenced with respect to the second ground return, (2) a voltage comparator having a pair of input terminals and is referenced with respect to the first ground return and having a referenced voltage of a chosen potential applied to one input terminal of the pair of input terminals, (3) a second current mirror circuit connected between the second voltage-to-current converter and the voltage comparator, the second current mirror circuit comprising:

(i) a first input terminal and a second input terminal for receiving the DC voltage, (ii) a matched pair of transistors with a base terminal of each transistor of the matched pair of transistors interconnected, a first transistor of the matched pair of transistors configured as a referenced diode with a collector terminal connected to the interconnected base terminal and with an emitter terminal connected to the first input terminal of the second current mirror circuit through an emitter resistor and providing a third output junction point for routing analog current out of the collector terminal and into the collector terminal of the second current-sink transistor circuit, a second transistor of the matched pair of transistors having an emitter terminal connected through another emitter resistor to the second input terminal of the second current-mirror circuit to receive the DC voltage and a collector terminal for sourcing an equal amount of analog current that flows out of the collector terminal of the first transistor of the second current-mirror circuit into a second input terminal of the voltage comparator, the analog current being sarcoid to the second input terminal of the voltage comparator being referenced with respect to the first ground return through a resistor, the voltage comparator providing output signals, as a comparison result of the two input voltage signals applied to the pair of input terminals, in the form of digital pulse signal representations of the analog signals placed on the single-wire bus.

2. Apparatus as in claim 1 wherein translation of the incoming analog waveforms from the first ground return to the second ground return occurs in the first current-mirror circuit and the translation of the analog waveforms emanating from the bus from the second ground return back to the first ground return occurs in the second current-mirror circuit.

3. Apparatus of claim 2 wherein the first ground return is the signal ground return of the transceiver and the second ground return is the ground return of the bus.

4. Apparatus as in claim 3 wherein the pulse width of the analog waveforms in the transceiver remains consistent throughout the transfer from the input terminal of the transmitter to the output terminal of the receiver.

5. With a transceiver in nodes of a vehicle communications network for transmitting and receiving variable pulse width modulated (VPWM) symbol information over a single-wire bus to a plurality of other nodes in the vehicle, the symbol information retaining consistent time information during the transmissions, each node receiving raw DC voltage from a vehicle battery, each node including a regulated power source providing signal power and a signal return, a microcontroller operating off signal power and a symbol encoder and decoder (SED) device for supporting bidirectional transmission of VPWM symbol information between nodes also operating off signal power, a ground translation circuit comprising:

a) a first voltage-to-current converter in a transmitter circuit of the transceiver that receives at an input terminal symbol signals as voltage waveforms referenced to the signal return from a signal conditioning circuit in the transceiver, and after converting the voltage waveforms to analog current signals, producing in an output loop of a current-sink transistor circuit, analog current waveforms that retain the pulse widths of the analog voltage waveforms placed at the input terminal;

b) a current-mirror circuit having a pair of identically matched transistors with the base terminal of each transistor of the matched pair of transistors interconnected, a first transistor of the matched pair of transistors configured as a referenced diode with an emitter terminal connected through an emitter resistor to receive the raw DC voltage, a collector terminal connected to the interconnected base terminals and having a first port for transferring analog current signals from the first transistor of the matched pair of transistors into the output loop of the first voltage-to-current converter such that when the first voltage-to-current converter operates, the first voltage-to-current converter sinks the analog current signal coming into the output loop to signal return, the sinking of the analog current signals causing a base-to-emitter voltage of the first transistor of the matched pair of transistors appropriate to the analog current signals at the circuit temperature and for that transistor type, the other transistor of the matched pair of transistors having another emitter resistor connected to receive the raw DC voltage sourcing a same amount of analog current through a collector terminal to an output terminal of the current-mirror circuit, the current-mirror circuit also having another reference diode connected at a junction point with the collector of the other transistor forming the output terminal of the current-mirror circuit and with an emitter of the another reference diode connected through a resistor to the independent ground return;

c) a bus driver circuit consisting of an independent transistor having a collector terminal connected to receive the raw DC voltage referenced with respect to the independent ground return and a base terminal connected to the output terminal of the current-mirror circuit for controlling the sourcing of analog current signals from an emitter terminal onto the single-wire bus in response to changes in the voltage with respect to the independent ground return that is applied to the base terminal, a first terminator resistor connected between the emitter of the independent transistor and the independent ground return providing changes in voltage across the single-wire bus; and d) a receiver circuit of the transceiver connected to the single-wire bus to receive the changes in voltage placed on the single-wire bus and referenced with respect to the independent ground return, the receiver containing:

(i) a second voltage-to-current converter for converting potential differences existing between the single-wire bus and the independent ground return and the potential differences appearing across another terminator resistor in an output loop of the second voltage-to-current converter referenced with respect to the independent ground return, (ii) a voltage comparator referenced with respect to the signal return, (iii) a second current-mirror circuit connected between the second voltage-to-current converter and the voltage comparator and connected to receive the raw DC voltage from the vehicle battery, the second current-mirror circuit also having a pair of matched transistors with the base terminal of each transistor of the matched pair of transistors interconnected, a first transistor of the matched pair of transistors configured as a referenced diode with an emitter terminal connected to receive the raw DC voltage through a first emitter resistor, a collector terminal connected to the interconnected base terminals and having a first port for transferring analog current signals from the first transistor of the matched pair of transistors into the output loop of the second voltage-to-current converter such that when the second voltage-to-current converter operates, the second voltage-to-current converter sinks the analog current signals coming into the output loop of the second voltage-to-current converter to the independent ground return, the sinking of the current causing a base-to-emitter voltage of the first transistor of the matched pair of transistors appropriate to the analog current signals at the circuit temperature and for that transistor type, the other transistor being matched to the first transistor having an emitter terminal connected to the raw AC voltage through a second emitter resistor sourcing a like amount of analog current signals to a collector terminal to the signal return through a collector resistor and to a first input terminal of the voltage comparator, a second input terminal of the voltage comparator receiving DC current signals from a fixed voltage source of a chosen potential referenced with respect to the signal return so that the voltage comparator produces at an output terminal digital pulse widths equal to the pulse widths of the analog voltage signals applied to the input of the first voltage-to-current converter.

* * * * *

UNITED STATES PATENT AND TRADEMARK OFFICE
CERTIFICATE OF CORRECTION

PATENT NO. : 5,432,817

DATED : July 11, 1995

INVENTOR(S) : Hormel et al

It is certified that error appears in the above-identified patent and that said Letters Patent is hereby corrected as shown below:

On title page, item

[73] Assignee: Delete "Corporation Chrysler" and insert therefor ---- Chrysler Corporation ----.

Signed and Sealed this

Nineteenth Day of March, 1996

Attest:

BRUCE LEHMAN

*Attesting Officer*     Commissioner of Patents and Trademarks